April 13, 1965     A. HERR     3,178,088
LINED, WOUND TUBULAR CONTAINERS OR PIPES
Filed May 29, 1962     2 Sheets-Sheet 1
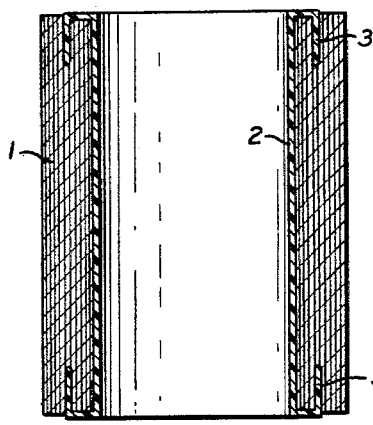
FIG. 1.
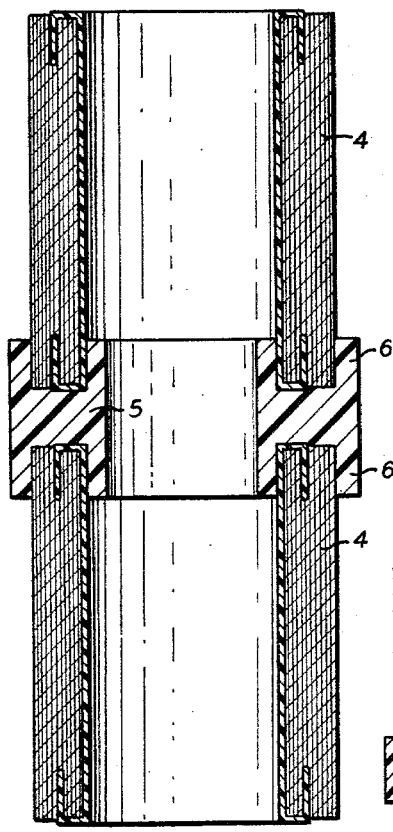
FIG. 2.
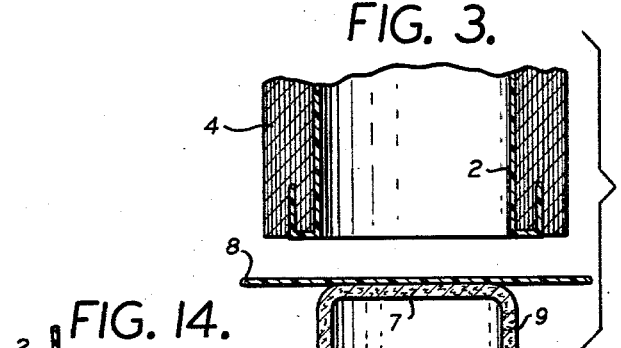
FIG. 3.
FIG. 14.
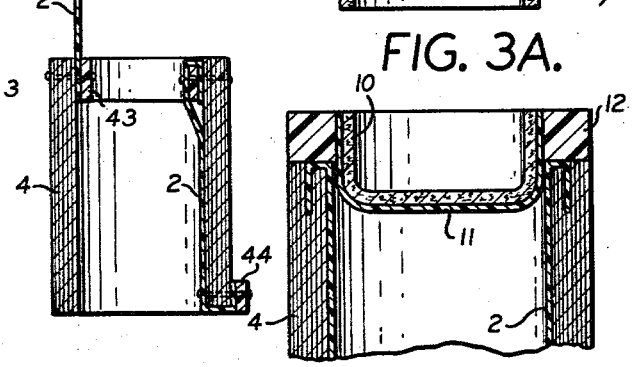
FIG. 3A.
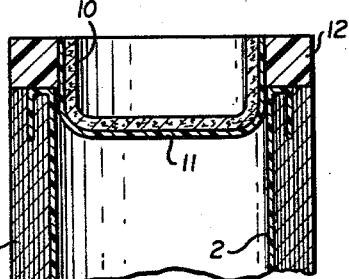
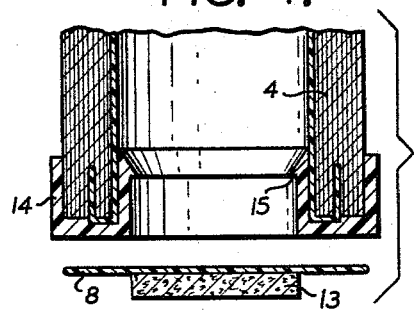
FIG. 4.
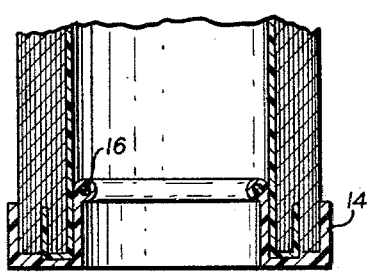
FIG. 4A.
INVENTOR
ALFONS HERR
BY
ATTORNEY.

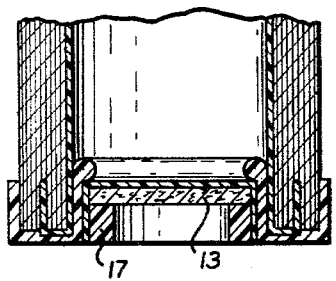
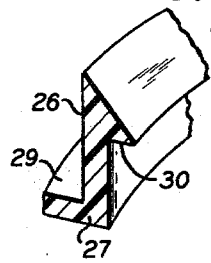
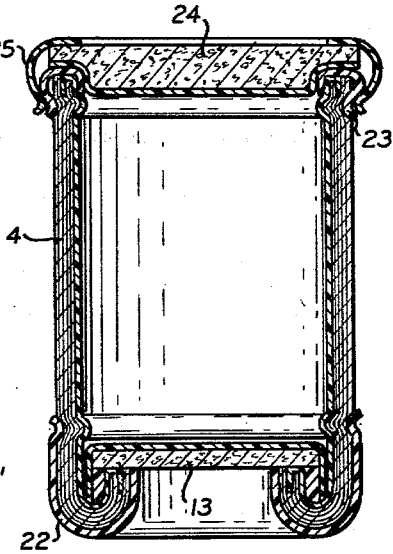
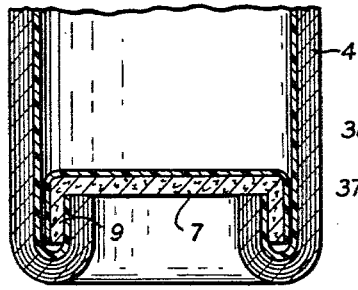
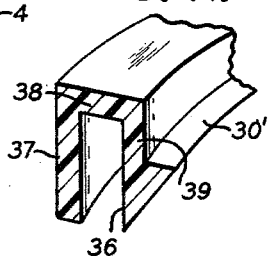
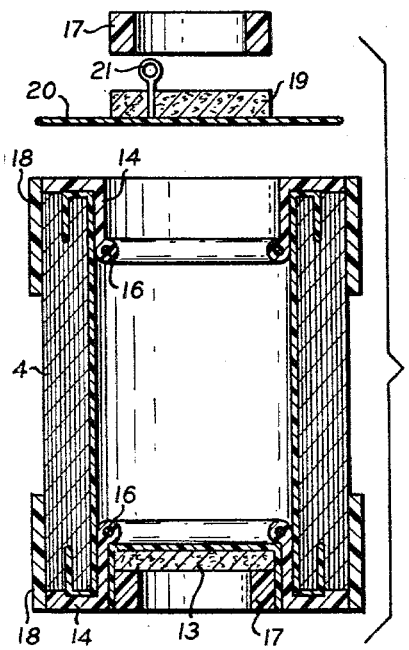
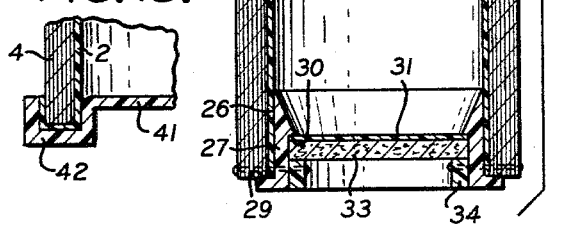
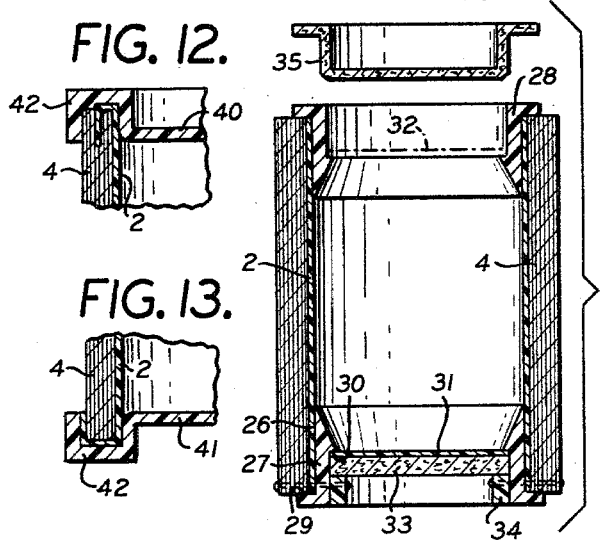

3,178,088
LINED, WOUND TUBULAR CONTAINERS OR PIPES

Alfons Herr, Karlsruhe, Baden, Germany, assignor to Ultra Kunststoffverarbeitung G.m.b.H., Durmersheim, Baden, Germany, a corporation of Germany
Filed May 29, 1962, Ser. No. 198,489
Claims priority, application Germany, May 30, 1961, U 8,063; May 14, 1962, U 8,953
3 Claims. (Cl. 229—4.5)

The present invention relates to pipes wound of double material, the outer walls of which consist of paper, paste board, fibrous material, veneers, plywood layers, lengths of textile fabric, sheet metal or other windable material and the inner walls of which consist of artificial material. Furthermore, the present invention relates also to measures adapted to form pipe lines or tubular containers from such wound pipe sections made of a double material and to a method of making such hollow bodies.

It is already known to form pipes of paper, paste board, lengths of textile fabric, or similar material by winding a plurality of layers of these materials. This is brought about in such manner, that a layer of glue is applied to one side of the material to be wound, which layer of glue secures together the individual layers to a solid pipe by a drying process following the winding step. Such manufactured pipes find their applications, for instance, for sewers, ceiling filling bodies or boarding bodies. Also packing containers are made of these pipes, by closing the same by means of insertion of bottoms and covers.

It is also known to dip such pipes thereafter, in order to impregnate the same or to provide the same by other means with protection layers, in order to protect particularly the inner walls against humidity, chemical attacks or corrosion, and, thereby to expand the range of applications of these economically produced bodies. In many instances the effect obtained thereby has been found, however, as insufficient. First of all, if the manufacture of tubular containers for receiving and for transporting of aggressive liquid or paste-like goods of the chemical industry is to be considered, the lackings concerning the stability and concerning the density have been found to occur. For this purpose materials having the characteristics of certain artificial material, as polyethylene and polystyrol or polyvinyl chloride are required.

For this reason so-called insert containers for receiving such filling goods have been created. They consist of artificial material and are inserted in carrying containers, which, for instance, again are formed of wound tubular hollow bodies. The insert-containers must necessarily have a wall thickness, which provides certain self-carrying characteristics. Yet these bodies, consisting of double material and made of carrying and insert containers, are too expensive for packing applications. For this reason insert bags have been proposed, which consist of thin lengths of artificial material and which are more economical than self-carrying insert containers. In these loosely inserted bags, the danger of damage exists, however, due to the self-movement during the transportation. Furthermore, particular measures are required for the filling and emptying of these bags. If the insert bag is secured, however, to the bottom of the container, then the danger of its winding and of the damaging to the foil of artificial material is possible. In both instances additional expenses occur for the filling as well as for the discharging procedure and for the particular working step for securing of the insert bag.

Finally, it has also been proposed to produce pipes consisting of a double material and to form packing containers therefrom, on the inner walls, bottoms and covers of which lengths of papers having a layer of artificial materal are provided thereon or condensed thereon. In this case one deals with containers, the tubular body of which is formed though of several layers, which has at the end of the preparation a compact wall. In case of damaging the pipe wall, the danger exists, therefore, that also the layer of artificial material adhering thereto is damaged and that a leakage can occur. Furthermore, it has been shown that the density or sealing of the bottom joint and of the butt joint of the length of paper carrying the layer of artificial material on the pipe wall is difficult to control, whereby such containers are not suitable for receiving goods consisting of thin liquids. It is, therefore, one object of the present invention to provide a pipe wound of double material for the forming of pipe lines or tubular containers and a method of making the same, wherein the drawbacks of the known structures are completely avoided.

It is another object of the present invention to provide a pipe wound of double material for the forming of pipe lines or tubular containers and a method of making the same, which has the advantages of an economical manufacturing by applying non-expensive starting materials and which is also resistant against aggressive chemical media. This object is brought about, in accordance with the present invention, by the manufacture of a pipe which consists of a wound, carrying tubular body and of an inner wall formed by a cover of an elastic foil of artificial material, the cover being applied freely on the inner face of the pipe without being connected therewith, the ends of which, however, are connected rigidly over the total periphery of the carrying pipe body. These pipes remain tight even upon damaging of the outer cover, while the elasticity of the foil of artificial material is retained as independent inner skin. Accordingly the tubular bodies designed in accordance with the present invention, can be applied to the manufacture of pipe lines and containers for the feeding, as well as for the transportation of chemically aggressive media with success and the other features of the present invention are related thereto.

Thus from the individual pipe parts entire pipe lines can be produced by joining the ends of the pipe parts in connecting pieces made of artificial material. In the same manner, containers can be produced by using individual pipe sections in a most economical manner, by closing the ends of the pipe sections, the inner space of which is covered with a foil of artificial material all around, and which is suitable for receiving chemically aggressive filling goods. Depending upon the size, the volume and the way of filling, the ends of the pipes are then closed with bottoms and covers, which have thus a loosely applied layer of artificial material towards the inner space of the containers, which is applied about the edge of the bottom and of the cover, respectively, and which forms towards the layer of artificial material of the inner wall of the pipe an absolutely tight closure. By clamping, gluing, welding, rolling and supporting with ring members, even heavy containers made of pipes wound of double material may be produced in this manner.

With these and other objects in view, which will become apparent in the following detailed description, the present invention will be clearly understood in connection with the accompanying drawings, in which:

FIGURE 1 is an axial section of a pipe wound of double material;

FIG. 2 is an axial section of two pipe parts which are joined by means of a connecting piece of artificial material;

FIG. 3 is an axial section of the end of a pipe with cuts for a rigid closure;

FIG. 3a is a section of a removable closure;

FIG. 4 is a longitudinal section of the end of a pipe with cuts for a rigid closure with an intensifying profile;

FIG. 4a is a section similar to that in FIG. 4, with a different embodiment of intensifying profile;

FIG. 5 is an axial section of the end of the pipe shown in FIG. 4a, with inserted bottom and supporting batten;

FIG. 6 is a longitudinal section of a pipe end with rolled in rigid closure;

FIG. 7 is an axial section of a heavy container formed of a pipe;

FIG. 8 is a longitudinal section of a heavy container formed of a pipe with a tension ring closure;

FIG. 9 is a longitudinal section of a wound pipe made of double material with a cover and bottom tension ring;

FIG. 10 is a cross-section of a tension ring disclosed in FIG. 9;

FIG. 11 is a cross-section of another embodiment of a tension ring;

FIG. 12 is a fragmentary section of a container with simple tensioning of the foil wound in the tubular body;

FIG. 13 is a fragmentary section of a container with simple tensioning of the foil applied about the tubular body; and FIG. 14 is a section of a pipe indicating another embodiment of a simple tensioning of the foil.

Referring now to the drawings, and in particular to FIG. 1, the pipe made of a double material comprises a carrying wound pipe body 1, made for instance of hard paper board sheets, the inner wall of the tubular body 1 being covered with an elastic foil 2 of artificial material, which is applied merely to the inner face of the pipe and of the pipe body 1, respectively, without being rigidly connected thereto. The ends 3 only of the foil of artificial material are bent over and wound rigidly into the layers of the pipe body 1. In order to bring about this structure the following steps are taken suitably:

For the manufacture of a piece of pipe of a length of about 50 cm. and a thickness of about 4 mm., a hose foil of artificial material of a width of about 54 cm. and aligned as to its center exactly to a length of paper is mounted on the winding mandrel of a winding machine. Then one-half of the paper layers provided for the final thickness of the pipe are wound in a width of 50 cm. up to the thickness of 2 mm. in conventional manner with the usual application of glue. The ends of the hose foil of artificial material extend thereby on each side for about 2 cm. These extending ends of the foil 2 are then bent over towards the paper layers, whereupon the winding of the remaining paper layers up to the desired wall thickness takes place. The ends of the foil 2 of artificial material are thereby, as shown in FIG. 1, worked rigidly into the pipe body 1, while the cover of artificial material is merely applied to the inner wall of the pipe.

A selected number of such pipe pieces 4 (FIG. 2) can be joined to longer pipe lines. As connecting means, rings of artificial material, the median full portion 5 of which terminates into two hollow rings 6 can be used, the hollow ring 6 corresponding to the wall thickness of the individual pipe pieces. In accordance with the requirements, these connections are merely set, glued, welded or mechanically connected.

The closing of one end of the pipe is performed, as shown in FIG. 3, by means of a bottom member 7 of cup-shaped material, over which is disposed a disk-like foil 8 of artificial material prior to its insertion into the pipe 4, which foil 8 extends beyond the bottom member 7, to such an extent, that it can be bent about the ends 9 during the insertion operation. A liquid-tight connection of the foil 2 of artificial material on the inner wall of the pipe with the covering material 8 of artificial material of the bottom member 7 can be achieved without any difficulty by means of gluing or welding. Instead of the foil 8 it is also possible, to insert a formed part of artificial material conforming to the shape of the bottom prior to the insertion of the bottom member 7, which formed part is welded with the layer of artificial material of the inner wall of the pipe. The same method is applied in case the other side of the pipe or the pipe portion is to be rigidly closed.

For the manufacture of a transporting container, however, a removable cover is inserted into the free end of the pipe. As shown in FIG. 3a, a foil 11 of artificial material is applied to the pre-formed cover member 10 and then a ring 12 is mounted over the cover piece 10 in such manner, that the artificial material engages smoothly. The ring 12, the foil 11 and the cover member 10 can be tacked on, glued or otherwise connected. Between the foil 2 of artificial material of the pipe piece 4 and the layer 11 of artificial material on the cover 10 likewise a liquid-tight closure results. Furthermore, by such arrangement of the cover any projecting parts on the outer face of the created tubular container are avoided.

For heavier pipes or containers having a larger volume, heavier bottoms and covers, as well as intensifying inserts are used. In FIG. 4 it is shown by example, how a heavy bottom 13 of wood veneer, fibrous material and pressurized fiber material and others is provided. An annular member 14 of artificial material is mounted on the end of the pipe 4, which member 14 has an inner abutment 15. The bottom 13 is inserted or pressed into the pipe 4 up to the abutment 15 with the engaging foil 8 of artificial material. Instead of the abutment 15, also a sealing rope 16 (FIG. 4a) can be welded into the member 14 of artificial material. Likewise it is possible, to secure the bottom 13 by means of an additional ring 17 (FIG. 5). Here again all parts can be glued together, welded, tacked, nailed or connected by double means, whereby it is of particular advantage that the manufacture of such liquid-tight closure cover connections between artificial material and artificial material can be secured safely with the simplest means.

For the securing of a bottom to be inserted into a pipe piece, for instance, as shown in FIG. 3, it will suffice, as shown in FIG. 6, to roll in, by means of conventional tools, the pipe cover 4 about the ends 9 of the cover 7.

A particularly heavy container manufactured from the wound pipe is shown in FIG. 7. Here the outer edges of the pipe piece 4 are secured by means of wood rings 18 of artificial material, or metal. A heavy bottom 13 is inserted, in the manner shown in FIG. 5, against the member 14 made of artificial material and is tensioned by means of an additional ring 17. The cover 19 consists also of heavy working material and is covered by means of a foil 20 of artificial material and is equipped with a pull ring 21. It is inserted against the same member 14 having the sealing rope 16 as the bottom and is tensioned likewise by means of a ring 17 for the purpose of safe transportation.

Referring now to FIG. 8, another heavy container is disclosed. Here the pipe cover 4 is rolled about the bottom 13 and in addition, a tension ring 22 is inserted. Also the open container part is equipped with a ring 23 against which the cover 24 seals directly, which cover 24 is maintained by means of the tensioning ring 25.

All cover structures permit the use of closures of artificial material for the purpose of filling and pouring of liquid filling material and to weld the closures with the layer of artificial material on the inside of the cover.

FIG. 9 discloses a further embodiment of the present invention. The layer 2 of artificial material is worked also at its ends no more rigidly in the carrying body of the pipe piece 4. It is rather welded with the vertical outer faces 26 (FIG. 10) of a tensioning ring 27 of artificial material for the bottom side of a tensioning ring 28 of artificial material for the cover side of the tubular containers. Each of the tensioning rings 27 and 28 is equipped with an annularly outwardly directed abutment face 29 and an angularly inwardly directed abutment face 30. A foil 31 is welded to the inner abutment face 30 of the bottom tensioning ring 27, which foil 31 complements the container bottom and then a hose-like foil 2 complementary to the length and periphery of the pipe piece is welded at its ends with the lateral faces 26 of the bottom and the cover tensioning ring. Depending upon the type of the container cover, a disk-like closing foil 32 can be applied to the inner abutment face 30 of the cover ring. Then the insertion of the prepared inner layer is provided in the lengthy tube piece, which constitutes the carrying port of the container and in particular from its bottom side. The tensioning ring 28 on the cover side is pulled through the pipe 4 jointly with the inner layer 2, until the outer abutment faces 29 of the tensioning rings are inserted about the ends of the pipe. The inner foil 2 is then tensioned. Furthermore, in conventional manner, a carrying bottom 33 can be inserted into the bottom tensioning ring 27 up to the abutment face 30 and a holding ring 34. The holding ring 34 is connected with the pipe wall 4, for instance, by means of clamps (not shown). As closure a cover 35 of artificial material can be provided. Likewise a cover with a filling and pouring opening with a cover of artificial material or for the tensioning ring closure can be applied.

In FIG. 11 another embodiment is shown for the tensioning rings. In accordance with this embodiment a U-shaped tensioning ring with a similar inner abutment face 30′ is provided, in which the inner foil made of artificial material is welded to the vertical wall 36 and which is pulled over the wall of the pipe 4 for tensioning of the inner foil, so that the legs 37, 38 and 39 surround the latter.

In FIGS. 12 and 13, other embodiments are presented for a simplified tensioning of the inner foil of artificial material in tubular containers. In this case the cover 40 and/or the bottom 41 are used as a self-carrying or also as a non-carrying member. The inner foil 2 can be worked into the pipe 4 (FIG. 12), while in other cases the bending over the foil about the end of the pipe 2 will suffice (FIG. 13). The cover and the bottom are made of artificial material and carry an outer annular recess 42, with which the foil and the wall of the pipe 4 are tensioned. Furthermore, a welding or glue connection can be produced between the cover and the bottom, respectively, and the foil, or a sufficient connection of all parts by means of tacking, clamping and the like. If the bottom or the cover are formed as non-carrying members, the conventionl intensifications may be inserted. Finally, in FIG. 14 is shown also another simplified tensioning of the inner foil for containers to be produced economically. Here a hose foil 2 of artificial material is inserted, shortly set, at one end and secured by means of a holding ring 43 which foil is then pulled through the inside of the pipe 4 and bent around the end of the pipe 4 and tensioned by means of a holding ring 44 mounted outside of the end of the pipe 4. The connection can take place by means of gluing, clamping or the like.

It is to be understood that the individually described embodiments of the foil tensioning can be combined. Thus, for instance, a tensioning ring of artificial material according to FIG. 10 or 11 can be applied at the bottom of a tubular container, while the foil on the cover side can be pulled over the end of the pipe 4 and may be secured by means of a holding ring, as shown in FIG. 14. Furthermore, it is also of advantage, to insert the cover and/or the bottom by use of a tensioning ring of artificial material according to FIG. 10 or 11 in tubular containers having no inner layer of artificial material, whereby the application of simplest means brings about a tight container body.

While I have disclosed several embodiments of the present invention, it is to be understood that these embodiments are given by example only and not in a limiting sense, the scope of the present invention being determined by the objects and the claims.

I claim:
1. A tubular container, comprising
an outer carrying wall wound of layers of windable material and having open ends,
an inner first lining of artificial material disposed loosely in said outer wall,
a bottom member secured to one open end of said outer wall,
a cover member secured to the other open end of said outer carrying wall,
means for rigidly connecting the ends of said inner lining to said open ends of said tubular wall about the entire periphery of the latter,
an inner second, disk-like lining of artificial material disposed loosely on the inner faces of said bottom member and said cover member, and
said first and second linings being connected to each other,
said inner first lining comprising a hose of artificial foil material having a length greater than that of said outer carrying wall, and
said hose is folded over outwardly and rigidly inserted between said layers of said outer carrying wall.
2. A tubular container, comprising
an outer carrying wall wound of layers of windable material and having open ends,
an inner first lining of artificial material disposed loosely in said outer wall,
a bottom member secured to one open end of said outer wall,
a cover member secured to the other open end of said outer carrying wall,
means for rigidly connecting the ends of said inner lining to said open ends of said tubular wall about the entire periphery of the latter,
an inner second, disk-like lining of artificial material disposed loosely on the inner faces of said bottom member and said cover member, and
said first and second linings being connected to each other,
said inner first lining comprising a hose of artificial foil material having a length greater than that of said outer carrying wall, and
said hose is folded over outwardly and rigidly inserted between said layers of said outer carrying wall,
a tensioning ring of artificial material mounted at each of said open ends of said outer carrying wall and having an outer diameter complementary to the inner diameter of said outer carrying wall,
said tensioning ring having at one end an outwardly directed, angular, first abutment face limiting the extent of insertion of said tensioning ring into said outer carrying wall and at the other end an inwardly directed, angular, second abutment face constituting an engagement face for said second, disk-like lining of artificial material and limiting the extent of insertion of said bottom and of said cover, respectively, into said open ends of said outer carrying wall, and
said tensioning ring clamping said ends of said first inner lining into engagement with said open ends of said outer carrying wall.
3. The container, as set forth in claim 2, wherein
said first inner lining of artificial material is welded to the lateral faces of said tensioning ring of artificial material, and
said inner second, disc-like lining of artificial material covering said bottom and said cover, respectively, is welded to said inwardly directed, angular, second abutment face of said tensioning ring.

(References on following page)

References Cited by the Examiner

UNITED STATES PATENTS

| | | | |
|---|---|---|---|
| 50,154 | 9/65 | Patric | 138—144 |
| 534,564 | 2/95 | MacPherson | 138—144 |
| 2,141,499 | 12/38 | Williams | 229—14 |
| 2,185,391 | 1/40 | Allen | 229—4.5 X |
| 2,213,253 | 9/40 | Novak | 138—144 |
| 2,380,549 | 7/45 | Rasor | 138—109 |
| 2,552,599 | 5/51 | Stout | 138—140 |
| 2,637,674 | 5/53 | Stahl | 138—141 |
| 2,798,510 | 7/57 | Martin et al. | 138—144 |
| 2,877,150 | 3/59 | Wilson | 138—141 |
| 2,932,597 | 4/60 | St. John et al. | 138—141 |
| 3,037,529 | 6/62 | Hanick | 138—144 |

FOREIGN PATENTS

| | | |
|---|---|---|
| 1,277,837 | 3/60 | France. |
| 848,809 | 9/60 | Great Britain. |

GEORGE O. RALSTON, *Primary Examiner.*
EDWARD V. BENHAM, *Examiner.*